United States Patent [19]
Deis et al.

[11] 3,733,499
[45] May 15, 1973

[54] PYROELECTRIC DETECTOR

[75] Inventors: Daniel W. Deis, Pittsburgh; George W. Roland, Monroeville, both of Pa.

[73] Assignee: Westinghouse Electric Corporation, Pittsburgh, Pa.

[22] Filed: Apr. 20, 1972

[21] Appl. No.: 246,008

[52] U.S. Cl.............310/4, 250/83.3 H, 423/508, 338/18, 317/241
[51] Int. Cl..............................H01l 15/00
[58] Field of Search................310/4, 9.4, 9.5; 338/18; 317/241; 423/508; 250/83.3 H

[56] References Cited

UNITED STATES PATENTS

| | | | |
|---|---|---|---|
| 2,893,831 | 7/1959 | Bither, Jr.....................423/508 |
| 3,096,287 | 7/1963 | Rabenau....................317/241 UX |
| 3,110,685 | 11/1963 | Offergeld....................423/508 X |
| 3,322,575 | 5/1967 | Ruehrwein...................310/4 X |
| 3,390,090 | 6/1968 | Taylor et al..................423/508 X |
| 3,397,043 | 8/1968 | Spitzer........................423/508 |
| 3,444,438 | 5/1969 | Umblia et al.................317/241 X |
| 3,530,008 | 9/1970 | Samoilovich et al..........310/4 X |

*Primary Examiner*—D. F. Duggan
*Attorney*—F. Shapoe, Alex Mich, Jr. and R. D. Fuerle

[57] ABSTRACT

A pyroelectric detector is disclosed which comprises a crystal of $Tl_3AsSe_3$ having two opposing faces with an electrically conducting electrode contacting each face. The detector is connected to an amplifier, the output of which can be displayed on an oscilloscope or otherwise displayed or utilized electronically. The detector has superior electrical properties and can detect any form of radiation which increases the temperature of the crystal.

10 Claims, 4 Drawing Figures

PATENTED MAY 15 1973 3,733,499

PYROELECTRIC DETECTOR

BACKGROUND OF THE INVENTION

Certain crystals have the property of becoming charged at opposite ends when their temperature is changed. This phenomenon is known as pyroelectricity (crystals displaying the effect are said to be pyroelectric) and results from the anharmonic ionic vibrations possible in those crystal classes lacking a center of symmetry. Furthermore, crystals of those classes can display pyroelectricity only along a polar axis, a crystallographic direction in which the axial direction and its opposite are non-equivalent in a crystallographic sense. The phenomenon of pyroelectricity is well described in the literature (e.g., J. F. Nye, *The Physical Properties of Crystals*, Clarendon Press, Oxford, 1957).

The voltage generated in a pyroelectric material undergoing an increase in temperature is proportional to the rate of change in the temperature. Thus a rapid rise in temperature will generate a large voltage, but a constant temperature, even if high, will generate no voltage. By attaching electrodes to measure voltage changes a pyroelectric crystal can be made into a detector that can detect any type of radiation which increases the crystal temperature, including electromagnetic, certain particles, etc. Unlike other types of thermal detectors such as the bolometer, the output of pyroelectric detectors does not depend on them attaining thermal equilibrium with the incident radiation and therefore they can operate at higher frequencies. Also, they need not be cooled to obtain efficient operation.

A good pyroelectric material should have a high responsivity r, defined as the voltage output of the detector per watt of input:

$$r = \frac{R\lambda}{\rho c_p a \sqrt{1 + 2R^2C^2}}$$

wherein $R$ is the parallel resistance of the detector and load, $C$ is the parallel capacitance of the detector and load, $\rho$ is the crystal density, $c_p$ is the specific heat of the crystal, $a$ is the electrode separation, $\omega$ is the frequency, and $\lambda$ is the pyroelectric coefficient. The pyroelectric coefficient is the rate at which the polarization of the crystal changes with temperature; it is itself a function of temperature. The frequency, $\omega$, refers to the frequency at which pulses of radiation strike the pyroelectric material.

From the above equation it is clear that the greater the pyroelectric coefficient, the greater will be the responsivity. Also, the equation indicates that the less the dielectric constant of the crystal, which decreases C in the equation, the greater will be the responsivity.

It has been shown (A. M. Glass, Jour. Appl. Phys. 40, 4699 (1969)) that if $\omega RC >> 1$ the expression for responsivity reduces to:

$$r = (\lambda/\omega C \; \rho c_p a)$$

As the above formula indicates, the responsivity depends on the frequency. If $\omega RC >> 1$ then the responsivity does not depend on the frequency:

$$r = (R\lambda/\rho c_p a)$$

The frequency $f_B$ at which $\omega RC = 1$ is defined as the upper frequency limit of the bandwidth, $\Delta f$, the frequency range over which the detector can be operated without the frequency significantly affecting the responsivity. The lower limit of the bandwidth is determined by thermal considerations. While the detector can be operated in the frequency-dependent region, the associated electronics are more complicated and a good pyroelectric material therefore has a large bandwidth.

Finally, a good pyroelectric material should have a low minimum detectable power, $W_n$, so that it can detect very weak signals.

$$W_n^2 = [4kT(\rho c_p)^2 a^2 \Delta f/R \; \lambda^2]$$

where $k$ is Boltzman's constant and the other symbols are defined above.

In the above cited article by Glass, it was also shown that if the capacitance of a pyroelectric detector is greater than the load capacitance, a figure of merit for detector materials is $\lambda/\epsilon$ where $\epsilon$ is the dielectric constant. If the load is capacitance is large compared to that of the detector, the figure of merit is $\lambda$.

SUMMARY OF THE INVENTION

We have found that $Tl_3AsSe_3$ is a superior pyroelectric material. It has a wider intrinsic bandwidth and greater room-temperature pyroelectric coefficient than any other known material.

The room-temperature dielectric constant is low, resulting in high responsivity and figure of merit, $\lambda/\epsilon$. Above the intrinsic bandwidth the calculated responsivity is about 10 times higher than that of any other reported pyroelectric detector.

DESCRIPTION OF THE DRAWINGS

In FIG. 1 a crystal of $Tl_3AsSe_3$ has been cut into a rectangular shape. In all the drawings, the arrow marked c indicates the c-axis of the crystal (the polar axis) and the arrow marked R indicates the direction of incident radiation. The two faces perpendicular to the c-axis have been coated with electrodes 2 and 3.

In FIG. 2, a crystal 4 of $Tl_3AsSe_3$ has been coated with electrodes 5 and 6. Electrode 6 may be either absorbent or transparent.

In FIG. 3 a similar crystal 7 is coated with electrodes 8 and 9. Electrodes 9 is coated with an absorbing layer 10.

In FIG. 1 laser 11 produces coherent light beam 12. Portions of the beam pass through rotating chopper 13 producing pulses of light 14 which strike crystal 15 of $Tl_3AsSe_3$. Each pulse raises the temperature of the crystal a fraction of a degree for a fraction of a second. The temperature pulses generate a pyroelectric voltage which is sensed by electrodes 16 and 17 and sent to voltage amplifier 18 where it is amplified. The amplified voltage is sent to oscilloscope 19 and is displayed on screen 20 of the oscilloscope. (The peaks 21 of the pulses are not flat because of the small internal capacitance of the measurement apparatus.)

THE CRYSTAL

Figure 4:
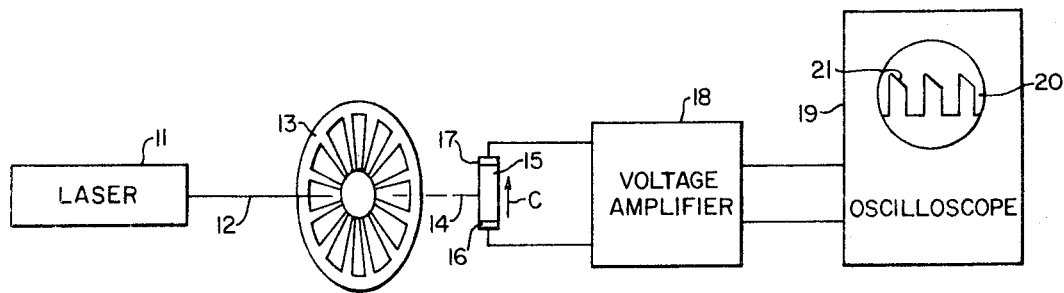
FIG. 4 is a diagrammatic drawing showing the use of a pyroelectric detector according to this invention in detecting radiation.
Figure 1:
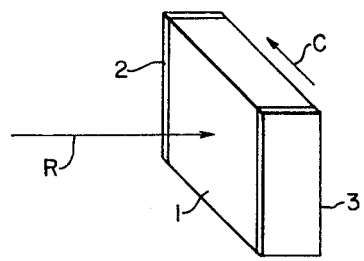
FIG. 1 is an isometric view of a pyroelectric detector according to this invention, having edge electrodes.

A detailed description of the preparation of a crystal of $Tl_3AsSe_3$ is given in application Ser. No. 181,409 George W. Roland and John D. Feichtner, titled "Non-Linear Optical Compound, Crystal, and Devices," filed Sept. 17, 1971. For acousto-optical applications of $Tl_3AsSe_3$ see application Ser. No. 209,489 by John D. Feichtner, Milton Gottlieb, and George W. Roland titled "Acousto-Optical Systems," filed Dec. 20, 1971. Briefly, the compound $Tl_3AsSe_3$ is prepared by melting together stoichiometric quantities of the elements thallium, arsenic, and selenium, and a crystal of the compound is prepared by melting the compound and lowering the liquid through a two-zone furnace having a steep temperature gradient at the $Tl_3AsSe_3$ melting point, $316°C \pm 2°C$. The crystal is stoichiometric within experimental limits.

The crystal of this invention is negative uniaxial in an optical sense and piezoelectric. Its X-ray Laue class is $32/m$, and the diffraction aspect derived from single crystal X-ray data is $R^{**}$. Of the two permitted space groups, $R3m$ and $R32$, space group $R3m$ is more probable based on the observed absence of optical activity. The length of the a-axis is about 9.90 A and the c-axis about 7.13 A. The transparency region is about 1.25 to about $17\mu$ m. and the crystal density is 7.83 gms./cc.

For the electrical measurements, a disk of $Tl_3AsSe_3$ 5.6 mm in diameter and 1.83 mm thick was electroded with thermally evaporated Cr—Au electrodes. The dielectric constant at 1 Mhz was measured as 34.5 using a vector impedance bridge (Hewlett Packard 4815A). The electrical conductivity at 33 hz was $2.2 \times 10^{-7}$ ohms$^{-1}$ cm$^{-1}$ using another vector impedance bridge (Hewlett Packard 4800A). These measurement frequencies were chosen to obtain the best possible accuracy in the measurements. The pyroelectric coefficient ($\lambda$) was measured from 0°C or below to 70°C using the charge integration technique. (See A. M. Glass, Jour. Appl. Phys. 40, 4699 (1969)). The crystal was heated in a specially constructed sample holder immersed in an oil bath. From the slope of the integrated spontaneous polarization curve versus temperature the value of $\lambda$ was estimated to be $0.250\mu C/cm^2-°C$ at 23°C and 0.450 at 40°C. The value $0.350\mu C/cm^2-°C$ is believed to be a reasonable value at ambient temperature (27°C).

All of the quantities necessary for calculating the responsivity $r$, and the minimum detectable powder $W_n$ were found experimentally except for $c_p$, the heat capacity, which was estimated to be 0.2 Joules/gm—°K by summing the heat capacities of the individual elements. Assuming a detector configuration of an $0.5 \times 0.5$ mm$^2$ $\times 20\mu$ m element with face electrodes, the intrinsic bandwidth of $Tl_3AsSe_3$ was calculated as 12,000 Hz, the responsivity below $f_B$ as 410 V/W and above $f_B$ as $4.7 \times 10^6$ (V—Hz)/W, the minimum detectable power as $6 \times 10^{-9}$ (W—Hz$^{-1/2}$), and $\lambda/\epsilon$ as 1000. The detector can separate pulses as short as about $10^{-9}$ seconds. These figures may be improved as better crystals are grown. Also, as is well known, the bandwidth can be increased by resistively biasing the detector element, although this reduces responsivity.

The size of the detector used depends upon the wattage of the radiation to be detected. If the wattage is high a large crystal may be used to decrease the temperature rise in the crystal and thus prevent thermal damage. Small crystals (less than 1mm$^3$ for example) are preferred for detecting weak signals because their smaller total heat capacity results in increased temperature rise per unit of incident radiation (increased voltage output). In any event, crystals larger than about 1 cm in diameter by $5\mu$ cm long are difficult to grow, and crystals smaller than $50\mu$ m square by $10\mu$ m thick are difficult to fabricate and handle.

In crystals such as $Tl_3AsSe_3$ which possess a single polar axis (the c-axis in $Tl_3AsSe_3$), the maximum pyroelectric voltage is obtained when the electroded crystal surfaces are perpendicular to the polar axis. Thus the preferred method of preparing a $Tl_3AsSe_3$ pyroelectric detector is to prepare the electroded surfaces so that they are perpendicular to the c-axis. In the event the electroded surfaces lie at some angle $\theta$ to the c-axis then the output signal is reduced by a factor $\cos \theta$ relative to that obtainable with c-axis normal faces. In addition, the crystal is preferably cut and ground with at least one optical face if the radiation does not strike an electrode, in order to reduce scattering losses that occur from unpolished surfaces. The radiation would then preferably enter perpendicular to the optical face.

THE ELECTRODES

Figure 2:
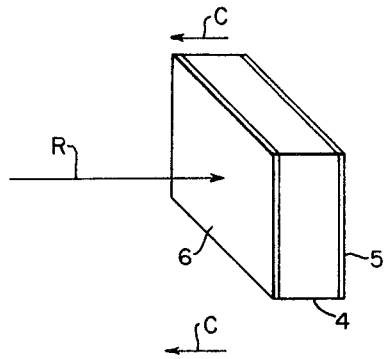
FIG. 2 is an isometric view of a pyroelectric detector according to this invention having face electrodes.
Figure 3:
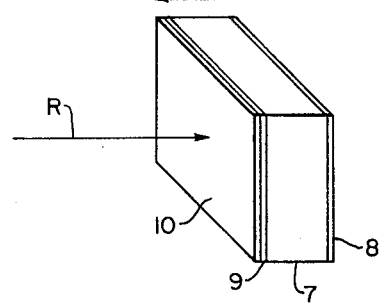
FIG. 3 is an isometric view of a pyroelectric detector according to this invention having face electrodes and an absorbing coating.

The electrodes preferably cover the entire surfaces of the electrode faces in order to collect the maximum current. They may be made of any conductive material, for example, gold, platinum, molybdenum, silver, tantalum, silicon, etc. Silver is convenient since it can be applied at room temperature in a paste which hardens. Electrodes can also be prepared by thermal evaporation methods; typically these are very thin, e.g., less than about 2000 A but may be thicker if desired. If the radiation is to pass through the electrode (i.e., a face electrode — see FIG. 2) the electrode must, be thin enough to be transparent to the radiation. Because an edge electrode has a higher resistance and a lower capacitance than does a face electrode it gives a faster response and is therefore preferred for those applications, such as signal receiving, where a fast response time is desirable. On the other hand, a face electrode may give better results for applications such as thermicon imaging devices.

An absorbing coating must be used on or opposite the face of the crystal through which the radiation is to enter whenever the radiation wavelength lies within the transparency region of the crystal. Also, the radiation must not, of course, cause a temperature increase which melts or destroys the crystal. The usual temperature increase during operation is less than 1°C and this is seldom a problem. The output of the detector is amplified by a suitable amplifier and is displayed, for example, with an oscilloscope.

EXAMPLE

The following example further illustrates this invention.

A crystal of $Tl_3AsSe_3$ was prepared by the previously-described Stockbarger technique, and a section was cut from it and polished to 1.04 mm thickness and ¼ inch square, c-axis perpendicular to the ¼ inch square faces. Each ¼ inch square face was electroded with silver paint and one of the faces was also coated with an absorbing layer of carbon particles. The electrodes were connected to a voltage amplifier which was connected to an oscilloscope.

The carbon-coated electrode was exposed to the light from a helium-neon laser at 6328 A which was chopped at a frequency of 100 Hz. The layout of the apparatus and the output which resulted is illustrated in FIG. 4.

We claim:
1. A detector comprising
   1. a crystal consisting essentially of $Tl_3AsSe_3$ having two opposing faces which cross its c-axis; and
   2. an electrode contacting each of said faces.
2. A detector according to claim 1 wherein said faces are perpendicular to said c-axis.
3. A detector according to claim 1 which also has an optical face.
4. A detector according to claim 1 wherein at least one of said electrodes is transparent.
5. A detector according to claim 1 wherein at least one of said electrodes is radiation-absorbent.
6. A detector according to claim 1 wherein at least one of said electrodes is coated with a radiation absorbing material.
7. A detector according to claim 1 wherein said crystal is larger than $50\mu m$ square by $10\mu$ m thick and smaller than 1 cm square by 5 cm long.
8. A detector according to claim 1 wherein said electrodes are metal films less than 2000 A thick.
9. A detector according to claim 1 including means connected to said electrodes for amplifying a signal generated in said detector.
10. A detector according to claim 9 including means for displaying said amplified signal.

* * * * *